(12) United States Patent
Kobayashi et al.

(10) Patent No.: US 6,572,509 B2
(45) Date of Patent: Jun. 3, 2003

(54) TOROIDAL-TYPE CONTINUOUSLY VARIABLE TRANSMISSION

(75) Inventors: Norihisa Kobayashi, Kanagawa (JP); Hiroshi Kato, Kanagawa (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 09/982,967

(22) Filed: Oct. 22, 2001

(65) Prior Publication Data

US 2002/0049114 A1 Apr. 25, 2002

(30) Foreign Application Priority Data

Oct. 23, 2000 (JP) .................................. 2000-322795

(51) Int. Cl.[7] .............................................. F16H 13/10
(52) U.S. Cl. ............................................ 476/45; 476/10
(58) Field of Search ................................ 476/40, 42, 45, 476/9, 10; 184/75, 76

(56) References Cited

U.S. PATENT DOCUMENTS

| | | |
|---|---|---|
| 3,823,613 A | 7/1974 | Abbott |
| 5,980,421 A | 11/1999 | Machida et al. |
| 6,113,513 A | 9/2000 | Itoh et al. |

FOREIGN PATENT DOCUMENTS

| | | |
|---|---|---|
| JP | 10-196751 | 7/1998 |
| JP | 10-238606 | 9/1998 |
| JP | 10-281269 | 10/1998 |
| JP | 10-299856 | 11/1998 |
| JP | 11-44351 | 2/1999 |
| JP | 11-63135 | 3/1999 |
| JP | 11-82658 | 3/1999 |
| JP | 2000-257685 A | 9/2000 |
| JP | 2001-12573 A | 1/2001 |
| JP | 2001-165264 A | 6/2001 |

*Primary Examiner*—David Fenstermacher
(74) *Attorney, Agent, or Firm*—Sughrue Mion, PLLC

(57) ABSTRACT

The toroidal-type continuously variable transmission comprises a hydraulic loading mechanism of an oil pressure type for pushing an input disk toward the disposition side of an output disk to thereby transmit the rotation power of the input disk to the output disk, and a countersunk spring incorporated in a hydraulic chamber formed in the loading mechanism for elastically pushing the input disk toward the disposition side of the output disk. In the toroidal-type continuously variable transmission, there are formed a plurality of slits in the countersunk spring and, when oil is supplied into the inside area of the countersunk spring within the hydraulic chamber by and from a hydraulic pump, the oil in the inside area of the countersunk spring is allowed to flow through the slits into the outside area of the countersunk spring.

8 Claims, 5 Drawing Sheets

TOROIDAL-TYPE CONTINUOUSLY VARIABLE TRANSMISSION

BACKGROUND OF THE INVENTION

The present invention relates to a toroidal-type continuously variable transmission that is used, for example, as a transmission mechanism of a vehicle.

Conventionally, as a transmission mechanism of a vehicle, there has been developed and used practically a toroidal-type continuously variable transmission.

Now, FIG. 6 shows the structure of a half-toroidal-type continuously variable transmission of a double cavity type. This toroidal-type continuously variable transmission comprises, within a housing 1, a first input disk 2a and a first output disk 3a respectively forming a first cavity 1a as well as a second input disk 2b and a second output disk 3b respectively forming a second cavity 1b.

A pair of power rollers 5 is interposed between the first input and output disks 2a and 3a. The outer peripheral surfaces of the power rollers 5 are respectively contacted with the traction surfaces 4 of the respective disks 2a, 3a. Between the second input and output disks 2b, 3b as well, there are interposed a pair of power rollers 5, while the outer peripheral surfaces of these power rollers 5 are also respectively contacted with the traction surfaces 4 of the respective disks 2b, 3b.

These power rollers 5 are rotatably mounted on their respective trunnions 7 by power roller bearings 6. The respective trunnions 7 can be swung about their associated trunnion shafts 8.

The traction surfaces 4 of the respective disks 2a, 2b, 3a, 3b are each formed as a concave-shaped surface which can be obtained by rotating an arc, the center of which is the trunnion shaft 8, about an axis extending at right angles to the trunnion shaft 8.

The first input disk 2a is mounted on an input shaft 10 in such a manner that it can be moved in the axial direction of the input shaft 10 with respect to the input shaft 10 while it is prevented against rotation by a ball spline 11.

The second input disk 2b is mounted on the input shaft 10 by a loading nut in such a manner that it is prevented against rotation by an involute spline 12. Therefore, the input disks 2a, 2b can be rotated integrally with the input shaft 10. This input shaft 10 can be driven or rotated by a drive source such as an engine.

The output disks 3a, 3b are interposed between the input disks 2a and 2b. The first output disk 3a is disposed opposed to the first input disk 2a, while the second output disk 3b is disposed opposed to the second input disk 2b.

These output disks 3a, 3b are respectively supported on the input shaft 10 through bearings 13, 14 in such a manner that they can be rotated with respect to the input shaft 10. And, the output disks 3a, 3b are connected to each other by a connecting member 15 and can be rotated in synchronization with each other. On the connecting member 15, there is disposed an output gear 16.

On the back surface side of the first input disk 2a, there is disposed a hydraulic loading mechanism 20 of an oil pressure type. The loading mechanism 20 includes a hydraulic cylinder 21 that is mounted on the input shaft 10 in such a manner that it is opposed to the back surface of the input disk 2a. The peripheral wall 21a of the hydraulic cylinder 21 is fitted with the outer periphery of the input disk 2a in a liquid-tight manner through a seal member 22 in such a manner that it can be slid in the axial direction thereof. Between the hydraulic cylinder 21 and input disk 2a, there is formed a hydraulic chamber 25 having a closed structure.

The hydraulic cylinder 21 includes a fit cylinder 26 that is disposed in the center portion of the hydraulic cylinder 21 integrally therewith, while the input shaft 10 is fitted into the fit cylinder 26. And, there is formed an oil supply passage 27 which extends from an inner hole 10a formed in the input shaft 10 to the hydraulic chamber 25 within the hydraulic cylinder 21. That is, by means of the oil supply passage 27, oil can be pressure fed into the hydraulic chamber 25 through a control valve 29 from a hydraulic pump 28 serving as an oil supply member.

In addition, within the hydraulic chamber 25, there is disposed a countersunk spring 30 serving as pre-load applying means. When the countersunk spring 30 is viewed from the side surface thereof, it has a flat trapezoid shape. When it is viewed from the plane surface thereof, it has a circular ring shape.

This countersunk spring 30 is fitted with the outer periphery of the fit cylinder 26 of the hydraulic cylinder 21 and is interposed between the back surface of the input disk 2a and the inner surface of the hydraulic cylinder 21 with the plate section thereof inclined such that the inner peripheral edge thereof can be contacted with the back surface of the input disk 2a and the outer peripheral edge thereof can be contacted with the inner surface of the hydraulic cylinder 21. By the way, the countersunk spring 30 may also be disposed in such a manner that the inner peripheral edge thereof can be contacted with the back surface of the hydraulic cylinder 21 and the outer peripheral edge thereof can be contacted with the back surface of the input disk 2a. Due to the elastic force of the countersunk spring 30, there is applied such a preload that allows the respective disks 2a, 2b, 3a, 3b and their respective power rollers 5 to be elastically contacted with each other.

And, when the input shaft 10 and input disks 2a, 2b are rotated in linking with a drive source such as an engine, oil is supplied from the hydraulic pump 28 into the hydraulic chamber 25 through the control valve 29. Due to the oil pressure of the thus supplied oil, the first input disk 2a is pushed toward the first output disk 3a. Since a reaction force which the hydraulic cylinder 21 receives is applied to the input shaft 10, the second input disk 2b is pushed toward the second output disk 3b.

The rotation power of the input disks 2a, 2b is transmitted through the power rollers 5 to the output disks 3a, 3b and, in linking with the output disks 3a, 3b, the output gear 16 is rotated.

To change the rotation speed ratio between the input shaft 10 and output gear 16, the respective power rollers 5 may be swung about their associated trunnion shafts 8. The swinging movements of the power rollers 5 change the contact positions between the peripheral surfaces of the power rollers 5 and the traction surfaces 4 of the disks 2a, 2b, 3a, 3b, thereby changing the rotation speed ratio between the input disks 2a, 2b and output disks 3a, 3b, that is, the rotation speed ratio between the input shaft 10 and output gear 16.

In order to enhance the power transmission efficiency of a transmission, it is important to secure a sufficient contact-pressure between the disks 2a, 2b, 3a, 3b and power rollers 5. In the present transmission, such contact pressure is secured by the oil pressure within the hydraulic chamber 25 as well as by the elastic force of the countersunk spring 30 within the hydraulic chamber 25.

The structure, in which, as described above, the countersunk spring 30 is incorporated into the hydraulic chamber 25 and the contact pressure between the disks 2a, 2b, 3a, 3b and power rollers 5 is secured by the oil pressure and the elastic force of the countersunk spring 30, is long known; for example, such structure is disclosed in U.S. Pat. No. 3,823,613.

In case where the countersunk spring 30 is incorporated in the hydraulic chamber 25, there is an advantage that the wear resistance of the countersunk spring 30 is enhanced, but there arises a problem that the presence of the countersunk spring 30 obstructs the flow of the oil within the hydraulic chamber 25.

That is, the circular-ring-shaped countersunk spring 30 is disposed within the hydraulic chamber 25 in the following manner that the inner peripheral edge of the countersunk spring 30 is contacted with the back surface of the input disk 2a and the outer peripheral edge thereof is contacted with the inner surface of the hydraulic cylinder 21, or, the inner peripheral edge of the countersunk spring 30 is contacted with the inner surface of the hydraulic cylinder 21 and the outer peripheral edge thereof is contacted with the back surface of the input disk 2a, while the plate section of the countersunk spring 30 is inclined between the inner surface of the hydraulic cylinder 21 and the back surface of the input disk 2a; and, in this state, the countersunk spring 30 presses against the input disk 2a elastically.

And, oil is supplied through the oil supply passage 27 into the inside area of the countersunk spring 30 within the hydraulic cylinder 21, and the oil then flows out into the outside area of the countersunk spring 30 within the hydraulic cylinder 21, thereby generating a given level of oil pressure.

However, since the inner peripheral edge of the spring 30 is contacted with the back surface of the input disk 2a and the outer peripheral edge thereof is contacted with the inner surface of the hydraulic cylinder 21, or, the inner peripheral edge of the spring 30 is contacted with the inner surface of the hydraulic cylinder 21 and the outer peripheral edge thereof is contacted with the back surface of the input disk 2a, there is formed only a slight clearance between them, so that the oil supplied into the inside area of the countersunk spring 30 is hard to flow out therefrom. As a result of this, the oil supplied into the interior of the hydraulic cylinder 21 suffers from a so called damping action, which delays the response characteristic between a hydraulic force to be controlled by the control valve 29 and a pressing force to be actually applied to the input disk 2a. Therefore, in case where torque is caused to vary suddenly, there is a fear that the pressing force can increase excessively to thereby degrade the oil flow efficiency or the pressing force can be short to thereby cause the input disk 2a to slip.

SUMMARY OF THE INVENTION

The present invention aims at eliminating the drawbacks found in the above-mentioned conventional toroidal-type continuously variable transmissions. Accordingly, it is an object of the invention to provide a toroidal-type continuously variable transmission in which, when oil is supplied into a hydraulic chamber, oil in the inside area of a countersunk spring can be made to flow smoothly into the outside area of the countersunk spring to thereby be able to raise the oil pressure of the whole of the hydraulic chamber up to a given level of oil pressure.

The above object can be attained by a toroidal-type continuously variable transmission according to the invention. The transmission comprises: an input disk and an output disk disposed such that they are disposed opposed to each other and are concentric with each other; power rollers swingably interposed between the input and output disks; and, a hydraulic loading mechanism of an oil pressure type for pushing the input disk toward the disposition side of the output disk to thereby transmit the rotation power of the input disk through the power rollers to the output disk, wherein the loading mechanism comprises: a hydraulic cylinder disposed on the back surface side of the input disk for defining a hydraulic chamber between the input disk and itself; an oil supply member for supplying oil into the hydraulic chamber to thereby push the input disk; a countersunk spring disposed in the hydraulic chamber and interposed between the back surface of the input disk and the inner surface of the hydraulic cylinder for elastically pushing the input disk toward the disposition side of the output disk; and, an oil flow passage which, when oil is supplied to the inside area of the countersunk spring disposed in the hydraulic chamber by the oil supply member, allows the oil in the inside area of the countersunk spring to flow smoothly into the outside area of the countersunk spring.

According to the invention, the oil flow passage may consist of a plurality of slits formed in the countersunk spring.

In addition, according to the invention, the oil flow passage may also consist of a plurality of circular-shaped through holes formed in the countersunk spring.

Further, according to the invention, the oil flow passage may also consist of a plurality of recessed grooves formed in the portion of the inner surface of a hydraulic cylinder that is to be contacted with the outer peripheral edge of a countersunk spring incorporated into the hydraulic chamber.

Furthermore, according to the invention, the oil flow passage may also consist of a plurality of recessed grooves formed in the portion of the inner surface of a hydraulic cylinder that is to be contacted with the inner peripheral edge of the countersunk spring incorporated into the hydraulic chamber.

Moreover, according to the invention, the oil flow passage may also consist of a plurality of recessed grooves formed in the portion of the back surface of the input disk that is to be contacted with the outer peripheral edge of a countersunk spring incorporated into the hydraulic chamber.

In addition, according to the invention, the oil flow passage may also consist of a plurality of recessed grooves formed in the portion of the back surface of the input disk that is to be contacted with the inner peripheral edge of the countersunk spring incorporated into the hydraulic chamber.

BRIEF DESCRIPTION OF THE DRAWINGS

5C is a sectional views of a main portion according to an another modification of the embodiment.

DETAILED DESCRIPTION OF THE PREFERRED EMBODIMENTS

Now, description will be given below of the preferred embodiments of a toroidal-type continuously variable transmission according to the invention with reference to FIGS. 1 to 5D. By the way, in these figures, the parts thereof corresponding to those employed in the above-mentioned conventional toroidal-type continuously variable transmission are given the same designations and thus the description thereof is omitted here.

Figure 1:
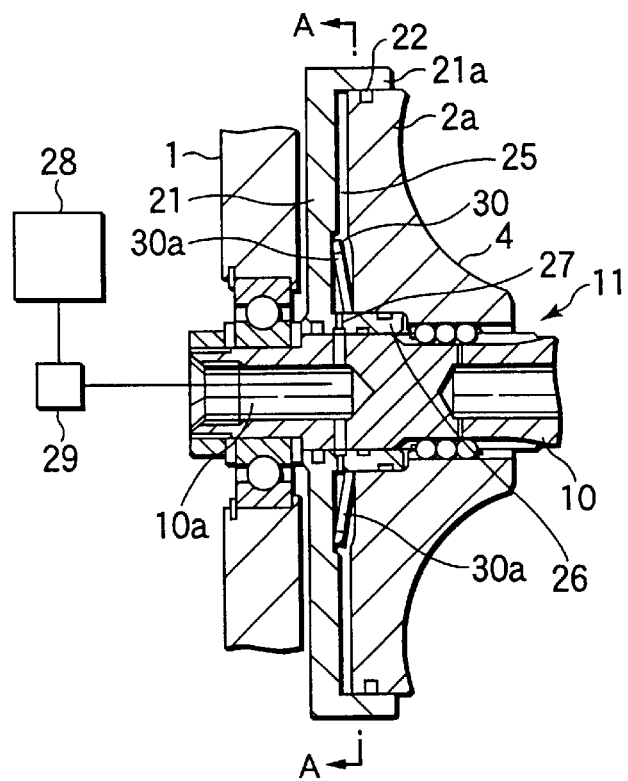
FIG. 1 is a section view of a first embodiment of a toroidal-type continuously variable transmission according to the invention.
Figure 2:
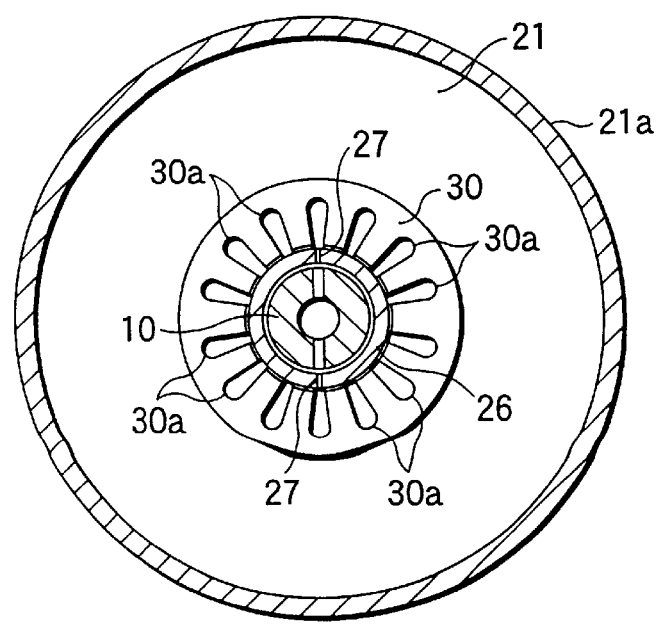
FIG. 2 is a section view taken along the line A-A shown in FIG. 1.

FIGS. 1 and 2 respectively show a first embodiment of a toroidal-type continuously variable transmission according to the invention. In the present embodiment, between a hydraulic cylinder 21 and an input disk 2a, there is formed a hydraulic chamber 25; in the hydraulic chamber 25, there is disposed a countersunk spring 30; and, in the countersunk spring 30, there are formed a plurality of slits 30a which serve as oil flow portions.

These slits 30a, as shown in FIG. 2, are formed on the plate surface of the countersunk spring 30 in such a manner that they extend in the radial direction of the countersunk spring 30 with the center axis of the countersunk spring 30 as their centers and, through these slits 30a, the inside and outside areas of the countersunk spring 30 are allowed to communicate with each other. Each of the slits 30a is formed into a U-shape that is opened at the inner periphery of the countersunk spring 30. By the way, in FIG. 2, the inner peripheral edge of the countersunk spring 30 is contacted with the back surface of the input disk 2a and the outer peripheral edge thereof is contacted with the inner surface of the hydraulic cylinder 21. However, alternatively, the inner peripheral edge of the spring 30 may be contacted with the inner surface of the hydraulic cylinder 21 and the outer peripheral edge thereof may be contacted with the back surface of the input disk 2a.

In the above structure, when oil is supplied from a hydraulic pump 28 into the hydraulic chamber 25 through a control valve 29 and an oil supply passage 27, oil existing in the inside area of the countersunk spring 30 is allowed to flow smoothly through the slits 30a into the outside area of the countersunk spring 30, thereby being able to quickly increase the oil pressure of the whole of the interior of the hydraulic chamber 25 up to a given level of oil pressure. Therefore, the input disk 2a can be pushed with a good response characteristic in accordance with the control of the oil supply by the control valve 29. Thus, even in case where torque happens to change suddenly, the input disk 2a can be pushed properly and accurately with a good response characteristic in accordance with the control by the control valve 29.

The countersunk spring 30 is incorporated in the interior of the hydraulic chamber 25 and, due to this, when it is expanded and contracted, the friction thereof is small, thereby being able to obtain good wear resistance. The direction, in which the input disk 2a is pushed out by the oil pressure of the oil within the hydraulic chamber 25, is a direction in which the flexed condition of the countersunk spring 30 is released. Therefore, there is no possibility that the countersunk spring 30 can be flexed further than the initially set condition thereof, which is advantageous in enhancing the durability of the countersunk spring 30.

The countersunk spring 30 including the slits 30a, when compared with a countersunk spring including no slit, is easy to flex, which makes it possible to reduce variations in a load to be generated by variations in the flex amount of the countersunk spring 30. Therefore, even in case where the oil pressure within the hydraulic chamber 25 rises to thereby move the input disk 2a in a direction where it is pushed out from the hydraulic cylinder 21, a decrease in the pushing force by the countersunk spring 30 is small and thus the hydraulic pump 28 can be driven with correspondingly lowered pressure.

Also, since the countersunk spring 30 including the slits 30a is small in variations in a load to be generated by variations in the flex amount of the countersunk spring 30, the countersunk spring 30 can also provide another advantage in facilitating the control of a clearance which is formed between the hydraulic cylinder 21 and input disk 2a for incorporation of the countersunk spring 30.

Figure 3:
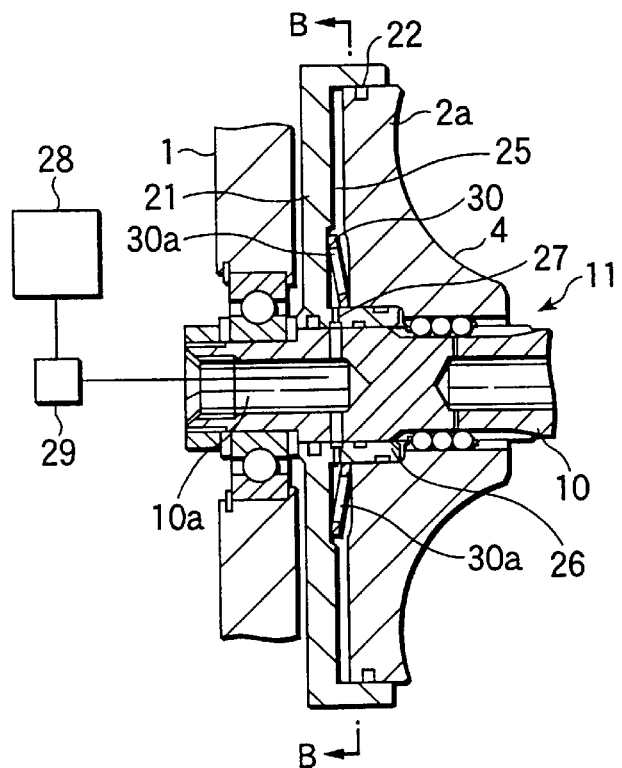
FIG. 3 is a section view of a second embodiment of a toroidal-type continuously variable transmission according to the invention.
Figure 4:
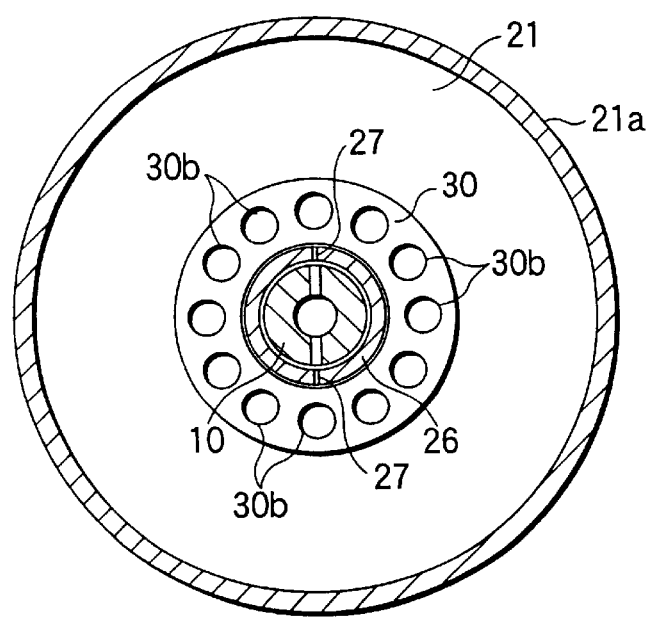
FIG. 4 is a section view taken along the line B-B shown in FIG. 3.

Now, FIGS. 3 and 4 show a second embodiment of a toroidal-type continuously variable transmission according to the invention. In the present embodiment, between a hydraulic cylinder 21 and an input disk 2a, there is formed a hydraulic chamber 25; in the hydraulic chamber 25, there is disposed a countersunk spring 30; and, in the countersunk spring 30, there are formed a plurality of circular-shaped through holes 30b which serve as oil flow portions.

These through holes 30b are formed on the plate surface of the countersunk spring 30, more specifically, on a circumference with the center axis of the countersunk spring 30 as its center in such a manner they are spaced at regular intervals and, through these through holes 30a, the inside and outside areas of the countersunk spring 30 are allowed to communicate with each other. By the way, in FIG. 4, the inner peripheral edge of the countersunk spring 30 is contacted with the back surface of the input disk 2a and the outer peripheral edge thereof is contacted with the inner surface of the hydraulic cylinder 21. However, alternatively, the inner peripheral edge of the spring 30 may be contacted with the inner surface of the hydraulic cylinder 21 and the outer peripheral edge thereof may be contacted with the back surface of the input disk 2a.

In the present structure, similarly to the structure employed in the first embodiment, when oil is supplied from a hydraulic pump 28 into the hydraulic chamber 25 through a control valve 29 and an oil supply passage 27, oil existing in the inside area of the countersunk spring 30 is allowed to flow smoothly through the through holes 30b into the outside area of the countersunk spring 30, thereby being able to quickly increase the oil pressure of the whole of the interior of the hydraulic chamber 25 up to a given level of oil pressure. Therefore, the input disk 2a can be pushed with a good response characteristic in accordance as the oil supply is controlled by the control valve 29 and thus, even in case where torque happens to change suddenly, the input disk 2a can be pushed properly and accurately with a good response characteristic in accordance with the control by the control valve 29.

Figure 5A:
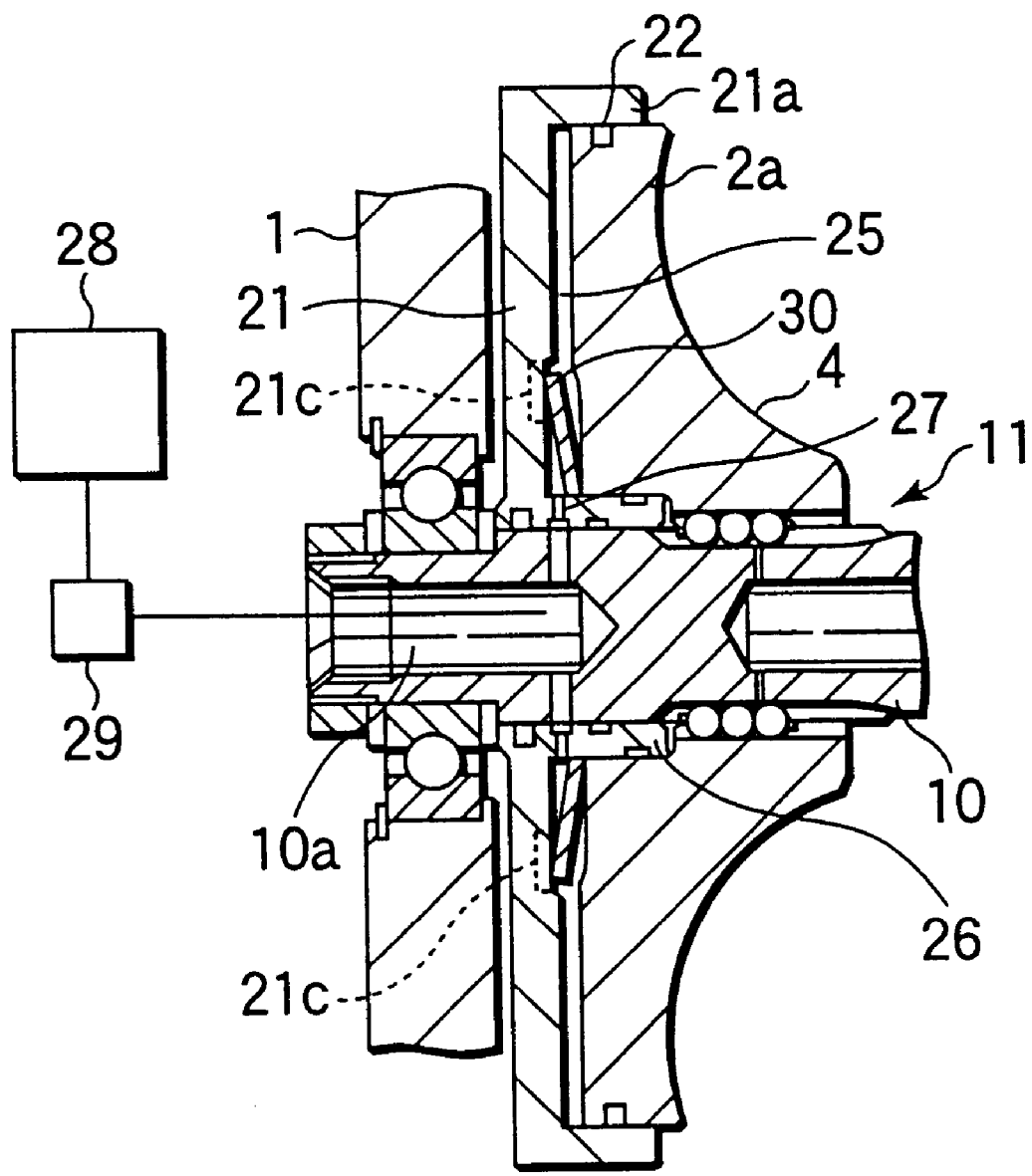
FIG. 5A is a section view of a third embodiment of a toroidal-type continuously variable transmission according to the invention.

Now, FIG. 5A shows a third embodiment of a toroidal-type continuously variable transmission according to the invention In the present embodiment, in the inner surface of a hydraulic cylinder 21, more specifically, in the portion thereof to be contacted with the outer peripheral edge of a countersunk spring 30 incorporated into a hydraulic chamber 25, there are formed a plurality of recessed grooves 21c which serve as oil flow portions.

These recessed grooves 21c are disposed in such a manner that they extend from the inside area of the countersunk spring 30 to the outside area thereof as well as are arranged in parallel to each other at a given pitch along the outer peripheral edge of the countersunk spring 30.

Figure 5B:
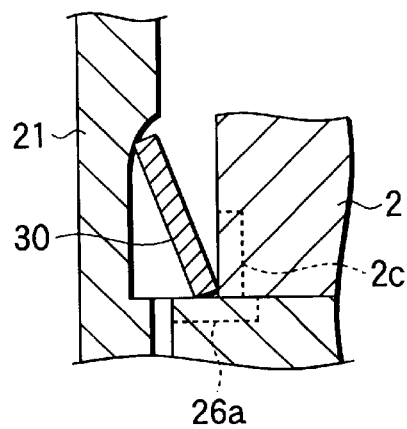
FIG. 5B is a sectional views of a main portion according to a modification of the embodiment, FIG.

However, in this case, as shown in FIG. 5B recessed grooves 2c serving as the oil flow passages may be formed in the portion of the back surface of the input disk that is to be contacted with inner peripheral edge of the countersunk spring 30 incorporated into the hydraulic chamber 25. Note that an outer peripheral surface of the fit cylinder 26 of the hydraulic cylinder 21 is provided with a plurality of slits 26a that extending in the axial direction.

In the present structure, when oil is supplied from a hydraulic pump 28 into the hydraulic chamber 25 through a control valve 29 and an oil supply passage 27, oil existing in the inside area of the countersunk spring 30 is allowed to flow smoothly through the recessed grooves 21d into the outside area of the countersunk spring 30, thereby being able to quickly increase the oil pressure of the whole of the interior of the hydraulic chamber 25 up to a given level of oil pressure. Therefore, the input disk 2a can be pushed with a good response characteristic in accordance as the oil supply is controlled by the control valve 29 and thus, even in case where torque happens to change suddenly, the input disk 2a can be pushed properly and accurately with a good response characteristic in accordance with the control by the control valve 29.

Also, in the present embodiment, the countersunk spring 30 is disposed such that the inner peripheral edge of the countersunk spring 30 is contacted with the back surface of the input disk 2a and the outer peripheral edge thereof is contacted with the inner surface of the hydraulic cylinder 21. However, alternatively, the countersunk spring 30 may also be disposed such that the inner peripheral edge of the countersunk spring 30 is contacted with the inner surface of the hydraulic cylinder 21 and the outer peripheral edge thereof is contacted with the back surface of the input disk 2a.

Figure 5C:
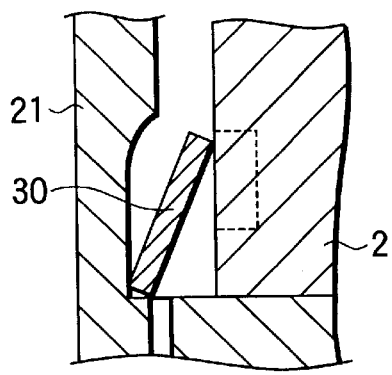
FIG. 5D is a sectional views of a main portion according to an another modification of the embodiment; and, FIG. 6 is a section view of the structure of a conventional toroidal-type continuously variable transmission.
Figure 5D:
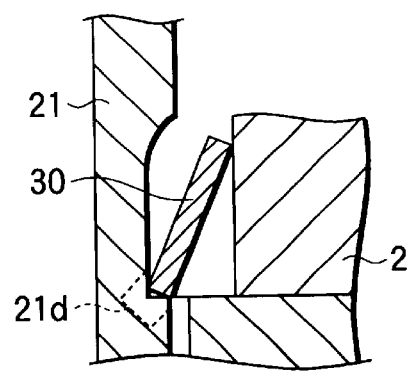
Figure 6:
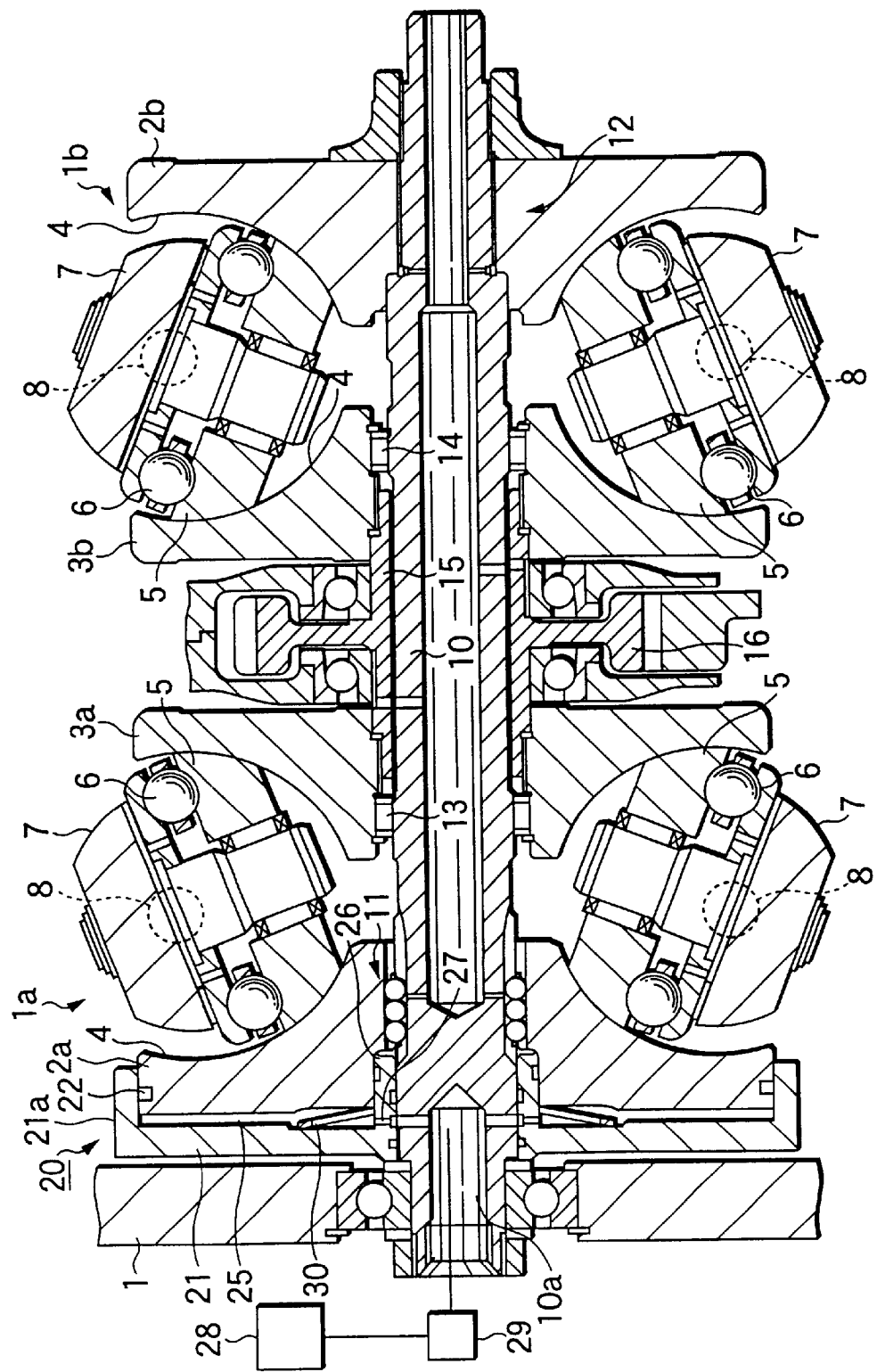

In this case, as shown in FIG. 5C recessed grooves 21c serving as the oil flow passages may be formed in the portion of the inner surface of the hydraulic cylinder 21 that is to be contacted with the outer peripheral edge of the countersunk spring 30 incorporated into the hydraulic chamber 25, or, as shown in FIG. 5D recessed grooves 2d serving as the oil flow passages may be formed in the portion of the back surface of the input disk 2a that is to be contacted with inner peripheral edge of the countersunk spring 30 incorporated into the hydraulic chamber 25.

By the way, according to the invention, there may be formed recessed grooves in the portion of the back surface of an input disk that is to be contacted with the inner peripheral edge of a countersunk spring, and oil in the inside area of the countersunk spring may be allowed to flow into the outside area of the countersunk spring through the thus formed recessed grooves. The essential thing is that oil flow portions to allow the oil existing in the inside area of a countersunk spring to flow smoothly therethrough into the outside area of the countersunk spring are formed in any proper portion of the input disk.

Also, it goes without saying that the present invention can be applied not only to a toroidal-type continuously variable transmission of a double cavity type but also to a toroidal-type continuously variable transmission of a single cavity type.

As has been described heretofore, according to the invention, when oil is supplied into the hydraulic chamber by the oil supply means, the oil in the inside area of the countersunk spring is allowed to flow smoothly into the outside area of the countersunk spring through the oil flow portions and, therefore, the whole of the interior of the hydraulic chamber can be raised up to a given level of oil pressure and thus the input disk can be pushed properly and accurately.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A toroidal-type continuously variable transmission, comprising:

an input disk and an output disk disposed such that they are opposed to each other and are concentric with each other;

a plurality of power rollers swingably interposed between said input and output disks; and, a hydraulic loading mechanism for pushing said input disk toward a side of said output disk to thereby transmit a rotation power of said input disk through said power rollers to said output disk, said hydraulic loading mechanism comprising:

a hydraulic cylinder disposed on the side of a back surface of said input disk for defining a hydraulic chamber between said input disk and said hydraulic cylinder;

an oil supply member for supplying oil into said hydraulic chamber to thereby push said input disk;

a countersunk spring disposed in said hydraulic chamber and interposed between the back surface of said input disk and an inner surface of said hydraulic cylinder for elastically pushing said input disk toward the side of said output disk; and, an oil flow passage, when oil is supplied to an inside area of said countersunk spring disposed within said hydraulic chamber by said oil supply member, for allowing said oil in the inside area of said countersunk spring to flow smoothly into an outside area of said countersunk spring.

2. The toroidal-type continuously variable transmission as set forth in claim 1, wherein said oil flow passage comprises a plurality of slits formed in said countersunk spring.

3. The toroidal-type continuously variable transmission as set forth in claim 2, wherein each of said plurality of slits is formed into a U-shape.

4. The toroidal-type continuously variable transmission as set forth in claim 1, wherein said oil flow passage comprises a plurality of circular-shaped through holes formed in said countersunk spring.

5. The toroidal-type continuously variable transmission as set forth in claim 1, wherein said oil flow passage comprises a plurality of recessed grooves formed in a portion of the inner surface of said hydraulic cylinder that is contacted with an outer peripheral edge of said countersunk spring.

6. The toroidal-type continuously variable transmission as set forth in claim 1, wherein said oil flow passage comprises a plurality of recessed grooves formed in a portion of the inner surface of said hydraulic cylinder that is contacted with an inner peripheral edge of said countersunk spring.

7. The toroidal-type continuously variable transmission as set forth in claim 1, wherein said oil flow passage comprises a plurality of recessed grooves formed in a portion of the back surface of said input disk that is contacted with an outer peripheral edge of said countersunk spring.

8. The toroidal-type continuously variable transmission as set forth in claim 1, wherein said oil flow passage comprises a plurality of recessed grooves formed in a portion of the back surface of said input disk that is contacted with the inner peripheral edge of said countersunk spring.

* * * * *